Figure 3:
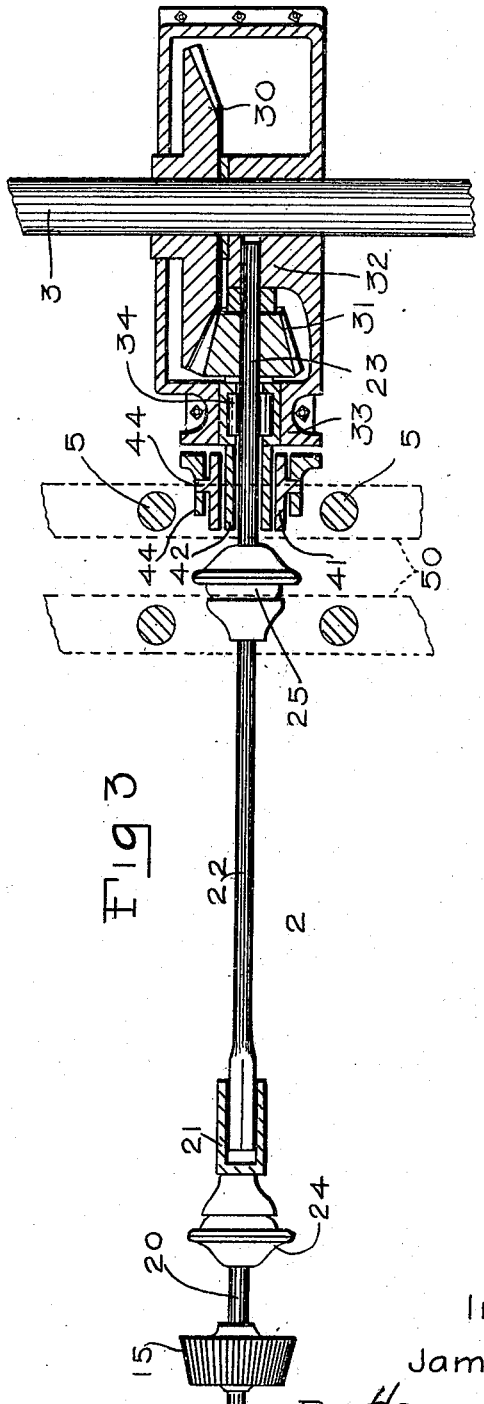

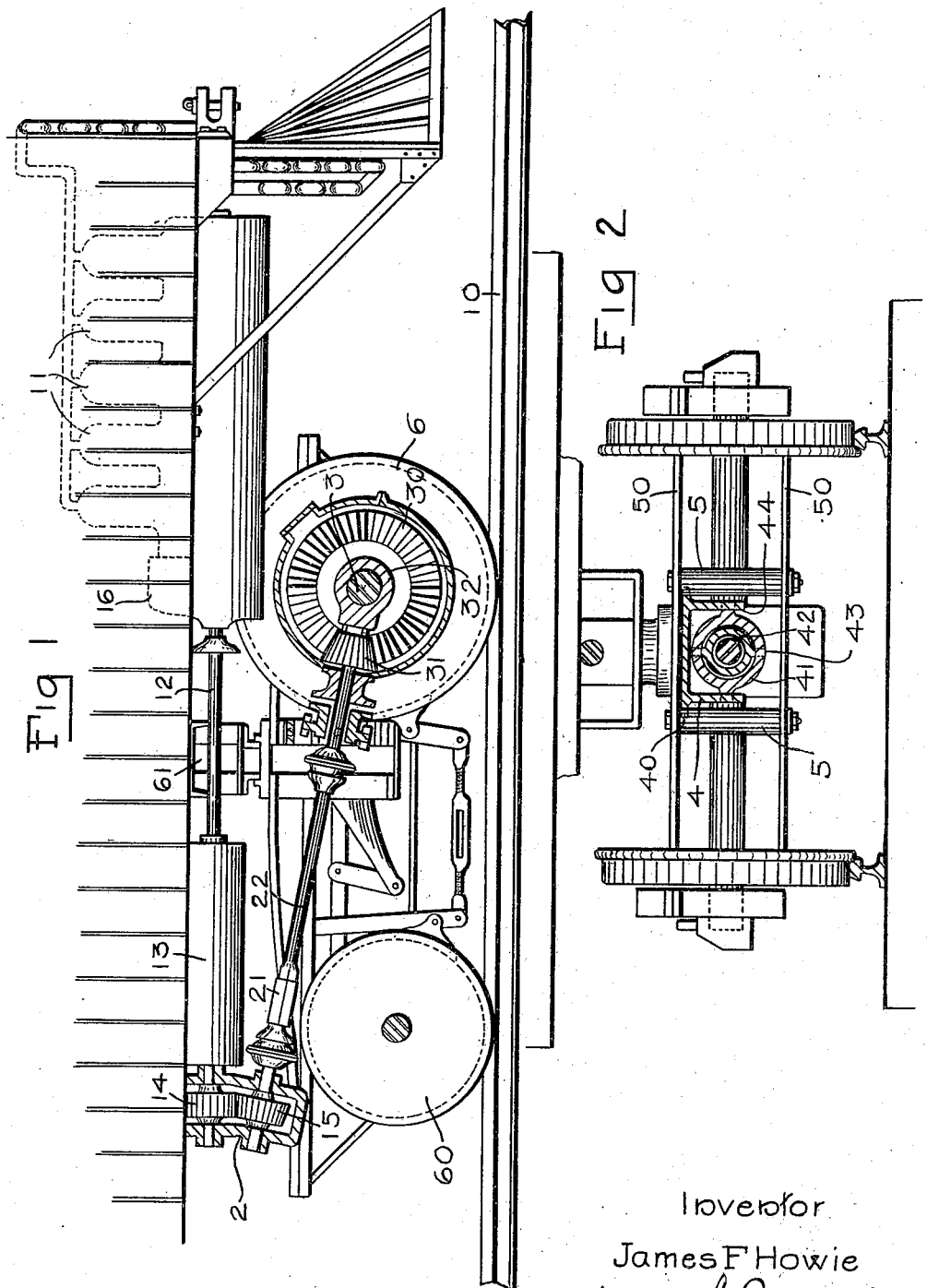

J. F. HOWIE.
MOTOR DRIVEN CAR.
APPLICATION FILED JULY 3, 1916.

1,203,741.

Patented Nov. 7, 1916.
2 SHEETS—SHEET 2.

Inventor
James F Howie
By Henry L. Reynolds.
Attorney

UNITED STATES PATENT OFFICE.

JAMES F. HOWIE, OF SEATTLE, WASHINGTON.

MOTOR-DRIVEN CAR.

1,203,741.  Specification of Letters Patent.  Patented Nov. 7, 1916.

Application filed July 3, 1916. Serial No. 107,227.

*To all whom it may concern:*

Be it known that I, JAMES F. HOWIE, citizen of the United States, and resident of Seattle, county of King, and State of Washington, have invented certain new and useful Improvements in Motor-Driven Cars, of which the following is a specification.

My invention relates to motor driven cars and particularly to such cars as are driven by the use of internal combustion engines.

The object of my invention is to provide a suitable mounting for the engine and a driving connection therefrom to the driving axle of the car, whereby a compact and efficient power transmission is provided, one which is sufficiently flexible to accommodate itself to inequalities of the track and the movements of the car body relative to the car axle, and one which, as well, permits the use of a satisfactory connection by which the speed ratio may be conveniently changed.

My invention comprises the particular parts and arrangement of parts which will be hereinafter described and illustrated in the drawings.

The construction herein described and illustrated in the drawings is the one which is now most preferred by me and is given as best illustrative of the principles of my invention.

Figure 1 is a side elevation of one end of a portion of a car body with the truck thereunder, the wheels at the near side of the truck being removed and parts of the driving mechanism being shown in section. Fig. 2 is an end elevation and section of the driving axle and a portion of the driving connections thereto. Fig. 3 shows in plan, partially in section, the shaft and mechanisms connecting the car axle with the main shaft of the engine.

In the drawings, 1 represents a portion of one end of a car body. Beneath this end of the car is a truck having two sizes of wheels 6 and 60. The type of truck herein illustrated is that which is often referred to as maximum traction type, that is, a truck in which the driving wheels 6 are made somewhat larger than the trailing wheels 60. Also the pivot axis of the truck which lies upon the line indicated by 61, is nearer to the axle 3 of the driving wheels than to the axle of the trailing wheels. While the use of the maximum traction type of truck is preferred, this is not an essential feature of my invention.

I have indicated at 11, the cylinders of an internal combustion engine. This engine is fixedly mounted upon the floor of the car, preferably by having lugs at its side resting upon the floor, the crank casing being beneath the floor level. This brings the shaft 12 of the engine beneath the floor of the car. In line with this shaft is the gear shaft 13, in which may be provided any suitable type of change gears, which are found suited to the requirements of the work.

A friction clutch may be used to connect the shaft of the engine with the transmission shaft 12 which friction clutch may be located at the point 16. The change gear mechanism rotates a stub shaft, which has mounted thereon a bevel gear 14, which bevel gear meshes with a like bevel gear 15, connected with a stub shaft 20, which forms part of the transmission to the car axle. The shaft which connects this gear with the car axle is composed of a plurality of parts. One of these parts is a stub shaft 23, which has one end journaled in a casing member or block 32 which is supported and turns upon the wheel axle 3, and which is also journaled in a roller bearing 32, carried by the same casing. This stub shaft 23 is connected with a stub shaft 20 at the other end of this transmission, by means of an intermediate shaft which is itself composed of two parts which telescope or permit of slight extension and reduction of length. This intermediate shaft, as shown, consists of the member 22, which is an ordinary sectional shaft and the socket member 21 into which it fits. The lengthening and shortening of this shaft will be very slight in amount, but is liable to occur within a limited range, by reason of the fact that the car body is mounted upon springs, and therefore, has a movement relative to the axle of the car.

The connection of the intermediate shaft with the stub shafts at the end, is through universal couplings 34 and 35, which couplings may be of any suitable construction.

The stub shaft 23, which is next to the car axle, is also provided with a suspension bearing from the car body, or from a portion of the truck frame which is connected with the car body without the interposition of the springs. This connection should be of a character which will permit slight movement of the bearings and of the stub shaft 23 lengthwise of the car. The construction shown employs a yoke 4 which is pivoted at 40 upon some member of the truck, as for instance, the pillars 5 which connect the top and bottom bars 50 of the truck frame. This pivot is horizontal and extends transversely of the length of the car.

A sleeve 42 constitutes a bearing sleeve for the shaft, this preferably containing rollers or balls to reduce the friction. This sleeve is provided with pivot journals 43, which are placed in a vertical plane and are journaled in a sleeve 41 which is provided with a pivot axle 44, arranged in a horizontal plane and pivoted in the lower ends of the yoke 4. This construction provides a universal coupling and a suspension connection therefor, permitting its bodily movement lengthwise of the car within a limited range.

The position of the universal coupling 25 is made such that it is directly under the pivotal connection between the truck and the car so that swinging of the truck relative to the axis of the car, as in passing about curves, will not affect the transmission of power through the same.

By the constructions above described, flexibility of the power drive between the engine and the car axle is secured, whereby it will accommodate itself to the various conditions met in service.

It is intended that the gear case 13 be provided with means whereby a change in the speed ratio may be made so as to obtain two or more different rates of speed, thereby adapting the car to service, either on the level, or on considerable grades. It also adapts it to running at considerable speed, or to run slower and haul considerable loads.

This driving transmission enables mounting the engine, its friction clutch and change gear mechanism upon the car body just below the floor where they are readily accessible from within the car. The backward angle of the transmission connections confines all the driving parts to one end of the car, making it compact. It also makes possible using friction clutch and change gear and reverse mechanisms of the type and range of an ordinary automobile.

What I claim as my invention, is:—

1. The combination with a car body and a supporting truck therefor, of a motor driven main shaft journaled on the car body and extending lengthwise the car, an angularly placed stub shaft also journaled on the car body, bevel gears connecting said stub shaft with the main shaft, a second stub shaft alined with the first and journaled on the truck, bevel gears connecting said second stub shaft with an axle of the truck, an intermediate shaft and universal couplings connecting said intermediate shaft with the stub shafts.

2. The combination with a car body and a supporting truck therefor, of a motor driven main shaft journaled on the car body and extending lengthwise the car, an angularly placed stub shaft also journaled on the car body, bevel gears connecting said stub shaft with the main shaft, a second stub shaft alined with the first, a bearing support for said latter stub shaft containing a universal coupling and having a fore-and-aft swinging support from the car body.

3. A motor car drive comprising a motor mounted on the car body, a shaft driven by said motor and extending lengthwise the car body, a supporting truck under the motor end of the car, said truck having a pivoting connection with the car body, a multiple-part shaft having a driving connection with one axle of the truck and with the shaft carried by the car body, universal couplings connecting the parts of said shaft, and a bearing for the part of said shaft which is connected with the axle containing a universal coupling and a support therefor permitting a limited movement lengthwise the car.

4. A motor car drive comprising a motor mounted on the car body, a shaft driven by said motor and extending lengthwise the car body, a supporting truck under the motor end of the car, said truck having a pivoting connection with the car body, a multiple-part shaft having a driving connection with one axle of the truck and with the shaft carried by the car body, universal couplings connecting the parts of said shaft, one section of said shaft being composed of extensible members.

5. A motor car drive comprising a motor mounted on the car body, a shaft driven by said motor and extending lengthwise the car body, a supporting truck under the motor end of the car, said truck having a pivoting connection with the car body, a multiple-part shaft having a driving connection with one axle of the truck and with the shaft carried by the car body, universal couplings connecting the parts of said shaft, the central section of said shaft being composed of telescoping members.

6. A motor car drive comprising a motor mounted on the car body, a shaft driven by said motor and extending lengthwise the car body, a supporting truck under the motor end of the car, said truck having a pivoting connection with the car body, a multiple-part shaft having a driving connection with one axle of the truck and with the shaft carried by the car body, universal couplings connecting the parts of said shaft, and a bearing for the part of said shaft which is connected with the axle containing a universal coupling and a support therefor comprising a pivoted yoke to which the universal coupling is pivoted to permit a limited movement lengthwise the car.

7. The combination with a car body and a supporting truck therefor having a pivot connection with the car body, of a motor driven main shaft journaled on the car body, a shaft section having a driving connection with an axle of the truck and a supporting connection from said axle, and a driving connection between both said shafts containing a universal coupling located in an extension of the pivot axis of the truck.

8. The combination with a car body and a supporting truck therefor having a pivot connection with the car body, of a motor driven main shaft journaled on the car body, a shaft having driving connection with an axle of the truck and a journal bearing supported on said axle, a second journal bearing for said shaft having a universally pivoted support from the truck frame, and driving connections between both said shafts containing a universal coupling positioned in line with the pivot axis of the truck.

9. The combination with a car body and a supporting truck therefor having a pivot connection with the car body, of a motor driven main shaft journaled on the car body, a shaft having driving connection with an axle of the truck and a journal bearing supported on said axle, a second journal bearing for said shaft having a universally pivoted support from the truck frame, and driving connections between both said shafts containing an interposed shaft and two universal couplings one of which is positioned in line with the pivot axis of the truck.

10. The combination with a car body and a supporting truck having a pivot connection therewith, of a driving mechanism comprising a motor, a friction driving connection and speed changing devices all mounted on the car body, a shaft section having driving connection with an axle of the truck and a journal bearing pivotally supported on said axle and a journal bearing supported from the truck frame by members connected to form a universal pivot, and a driving connection between said shaft and the parts carried by the car body containing universal couplings, one of which is positioned in the axis of the truck pivot.

Signed at Seattle, Washington, this 26" day of June, 1916.

JAMES F. HOWIE.

Copies of this patent may be obtained for five cents each, by addressing the "Commissioner of Patents, Washington, D. C."